US006675728B2

(12) United States Patent
Lee et al.

(10) Patent No.: US 6,675,728 B2
(45) Date of Patent: Jan. 13, 2004

(54) VENTED MINI-HOPPER FOR BULK FEED PARTICLE DELIVERY SYSTEM

(75) Inventors: Laurence K. Lee, Darien, IL (US); Guntis Ozers, Woodridge, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/101,873

(22) Filed: Mar. 21, 2002

(65) Prior Publication Data
US 2003/0177966 A1 Sep. 25, 2003

(51) Int. Cl.[7] .................................................. A01C 7/18

(52) U.S. Cl. .......................... 111/63; 111/200; 111/925; 111/175; 221/174; 221/278; 222/630

(58) Field of Search ................................ 111/175, 174, 111/176, 185, 179, 925, 200, 170, 63; 221/211, 278, 174; 222/630

(56) References Cited

U.S. PATENT DOCUMENTS

| | | | | | |
|---|---|---|---|---|---|
| 3,548,765 | A | * | 12/1970 | Grataloup | 111/60 |
| 4,646,941 | A | * | 3/1987 | Grosse-Scharmann et al. | 222/23 |
| 4,758,119 | A | * | 7/1988 | Frase et al. | 406/109 |
| 5,160,222 | A | * | 11/1992 | Noland | 406/124 |
| 5,161,473 | A | | 11/1992 | Landphair et al. | 111/176 |
| 5,379,706 | A | | 1/1995 | Gage et al. | 111/175 |
| 5,392,722 | A | * | 2/1995 | Snipes et al. | 111/174 |
| 5,915,312 | A | * | 6/1999 | Meyer et al. | 111/174 |
| 5,996,516 | A | | 12/1999 | Benneweis | 111/176 |
| 6,047,652 | A | * | 4/2000 | Prairie et al. | 111/174 |
| 6,116,284 | A | * | 9/2000 | Murray et al. | 138/39 |
| 6,148,863 | A | * | 11/2000 | Memory et al. | 137/899 |
| 6,158,363 | A | | 12/2000 | Memory et al. | 111/176 |
| 6,164,222 | A | | 12/2000 | Mayerle et al. | 111/175 |
| 6,192,813 | B1 | | 2/2001 | Memory et al. | 111/176 |
| 6,267,067 | B1 | | 7/2001 | Mayerle et al. | 111/170 |
| 6,290,433 | B2 | | 9/2001 | Poncelet et al. | 406/181 |
| 6,296,425 | B1 | | 10/2001 | Memory et al. | 406/197 |
| 6,298,797 | B1 | | 10/2001 | Mayerle et al. | 111/175 |

FOREIGN PATENT DOCUMENTS

| | | |
|---|---|---|
| JP | 4-278308 | * 10/1992 |

* cited by examiner

*Primary Examiner*—Victor Batson
(74) *Attorney, Agent, or Firm*—Rebecca Henkel; Brant Maurer

(57) ABSTRACT

A particulate distribution apparatus for receiving seed or other particulate from a pneumatic source and temporarily storing the seed for subsequent use by a metering device where the particulate is characterized by a particulate size, the apparatus comprising a housing including walls that form a cavity, a hopper inlet linkable to the duct outlet and a hopper outlet linkable to the metering device inlet, at least one of the housing walls forming vent apertures that are generally smaller than the particulate size.

21 Claims, 15 Drawing Sheets

VENTED MINI-HOPPER FOR BULK FEED PARTICLE DELIVERY SYSTEM

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention is related generally to agricultural implements and more specifically to an improved apparatus for transferring particulate material from a principal storage site to individual material metering hoppers mounted on planters or the like.

BACKGROUND OF THE INVENTION

In the past, distribution of seed (or other particulate material such as fertilizer) for use in a variety of agricultural operations has been facilitated via a planter apparatus including a wheel supported carrier frame having a hitch for linking to a tractor or other prime mover, an implement bar mounted to the frame perpendicular to the transport direction and a plurality of row units mounted to and essentially equispaced along the length of the implement bar. Among other components, each row unit typically includes some type of seed bin that opens downwardly into a metering device and some type of soil agitator (e.g., a coulter or knife member) juxtaposed on the transport side (i.e., in the direction of prime mover movement) of the dispenser. During transport through a field the agitator is forced through soil there below and forms a seed trench. As its label implies, the metering device dispenses a pre-selected quantity of seed downward and behind the agitator into the trench.

The individual seed bins generally have limited storage capacity. For instance, many row unit seed bins are limited to between one and three bushel volumes. For this reason, these types of planter assemblies required frequent bin refilling. Unfortunately, seed filling stations (e.g., typically a barn or other storage unit) are typically stationary and therefore filling exercises often required a trip out of the fields back to a station and then a trip back to the fields to continue the seeding process. These filling trips increased the overall time required to plant fields. In addition to the round trip time required to refill bins, the refilling process itself was tedious as each separate row unit bin had to be filled during each filling exercise.

In an effort to reduce the number of seed refilling exercises required to seed a field, the industry has developed systems including one or more large seed reservoir hoppers mounted to the carrier frame that are transported along with the row units. A seed distribution system in which seed is conveyed from an equipment mounted main hopper is described in U.S. Pat. No. 5,161,473 (hereinafter "the '473 patent") which issued on Nov. 10, 1992 and which is assigned to Deere and Company. The '473 patent utilizes a single main hopper which dispenses seed to a plurality of individual mini-hoppers. Each mini-hopper forms an outlet opening at a bottom end which is linked to and supplies seed to an individual row unit. The seed is fed from the main hopper into each mini-hopper by entraining the seed in an air stream contained in separate, individual seed transfer hoses that are connected between the main tank and each of the individual mini-hoppers.

U.S. Pat. No. 5,379,706 (hereinafter "the '706 patent") which issued on Jan. 10, 1995 and is assigned to Agco Corporation, describes another seed transporting system which also utilizes a central storage hopper for supplying a plurality of smaller satellite hoppers via a plurality of individual hoses or tubes running from the central hopper to each of the individual row units.

Most seed delivery assemblies that include a main and several mini-hoppers rely on assembly configuration to regulate seed delivery to the mini-hoppers. To this end, when seed accumulates in a mini-hopper, eventually the seed blocks the delivery duct outlet and hence seed and air flow there through. Eventually the metering device distributes seed from the mini-hopper, the duct outlet becomes unblocked and seed transport to the mini-hopper begins again.

One important requirement of any seed delivery assembly that includes a central or main hopper and a plurality of mini-hoppers is that the system be designed so that at least a minimum volume of seed is present in each mini-hopper at all times. Hereinafter the required seed volume will be referred to as a "required volume". Where less than the required volume occurs in a mini-hopper, it is possible that the row unit corresponding to the mini-hopper may empty the mini-hopper prior to delivery of additional seed to the mini-hopper. Where a mini-hopper is emptied, planting by the corresponding row unit is discontinuous and total field yield is reduced.

One problem with pneumatic seed delivery systems has been that seeds deposited within the mini-hoppers impede and eventually essentially block air flow (and hence seed delivery) to the mini-hoppers prior to the required volume accumulating in the mini-hoppers. For instance, in some cases it has been observed that even a few layers of seed accumulated at the bottom opening of a mini-hopper will essentially block air flow there through. In these cases, as indicated above, planting is discontinuous.

One other problem with pneumatic seed delivery systems that blow seed to mini-hoppers has been that the duct outlet that feeds seed to the mini-hoppers is typically directly above a corresponding metering device and therefore forced air and entrained seed blown into the mini-hopper, in some cases, may adversely affect operation of;the metering devices.

Therefore, a need exists for a mini-hopper that maintains a seed volume that is at least as great as the required volume and which blocks the air-seed stream from being directed at the metering devices.

BRIEF SUMMARY OF THE INVENTION

It has been recognized that a vent can be placed in each of the mini-hoppers that, if placed correctly, will result in at least the required volume of seed within each mini-hopper at all times. Generally, the vent is provided at least in part proximate a top end of the mini-hopper so that as seed blown into the mini-hopper accumulates near the bottom of the mini-hopper under the force of gravity, the vent remains unobstructed and additional seed can be delivered to the mini-hopper. Eventually the vent becomes blocked at which time air and seed flow to the mini-hopper is essentially blocked until the metering device disperses some of the seed from the underside of the mini-hopper. Again, when the vent becomes partially unblocked, seed delivery recommences. By placing the vent vertically high enough within the mini-hopper the required volume is essentially guaranteed.

In addition, by designing the mini-hopper so that the seed accumulates and forms a seed head corresponding to the required volume between the duct outlet and the metering device, the seed head blocks direct air and seed flow to the metering device and hence blocks the flow from adversely affecting metering device operation.

Consistent with the above discussion, the present invention includes an apparatus for use with a pneumatic particulate transport assembly, the assembly including a transport duct having a duct outlet and a particulate metering device having a meter inlet, the apparatus for receiving particulate from the transport duct and temporarily storing the particulate for use by the metering device where the particulate is characterized by a particulate size, the apparatus comprising a housing including walls that form a cavity, a hopper inlet linkable to the duct outlet and a hopper outlet linkable to the metering device inlet, at least one of the housing walls forming vent apertures that are generally smaller than the particulate size.

In at least some embodiments the housing forms the housing inlet in a top wall and the housing forms a downwardly opening housing outlet. More specifically, the housing may include a generally vertical side wall that traverses the distance between the top wall and the housing outlet and the side wall may form the vent apertures. Even more specifically, the side wall may form the vent apertures proximate the top wall.

In some embodiments the side wall may form the vent apertures throughout the side walls entire area between the top and bottom walls. Here, the apparatus may further include a cover member mounted to the housing, the cover member extending to a side of the side wall opposite the cavity, including a cover wall that is spaced apart from the side wall, substantially enclosing the side wall and forming at least one exhaust outlet.

In some embodiments the exhaust outlet opens proximate the housing outlet and it may open downward. In some embodiments the cover wall is substantially parallel to the side wall.

The housing may form a vent opening and the side wall may comprise a screen member received within the vent opening. The screen member may be removable from the vent opening. Here, the housing may form a slot for receiving the screen member within the vent opening. More specifically, the screen member may be characterized by a screen thickness dimension, the housing may include first and second facing lateral walls on opposite sides of the vent opening and the slot may include first and second facing parallel rib member pairs on the first and second walls, respectively, the first and second pairs defining the vent opening there between where each pair defines a dimension there between that is similar to the screen thickness dimension.

Some embodiments further include a cover member mounted to the housing, the cover member extending to a side of the rib member pairs opposite the cavity, including a cover wall that is spaced apart from the rib member pairs, substantially enclosing the rib member pairs and forming at least one exhaust outlet.

The invention also includes an apparatus for use with a pneumatic particulate transport assembly, the assembly including a transport duct having a duct outlet and a particulate metering device having a meter inlet, the apparatus for receiving particulate from the transport duct and temporarily storing the particulate for use by the metering device where the particulate is characterized by a particulate size, the apparatus comprising a housing including at least one side wall that defines a cavity, the housing forming a housing inlet proximate a top end of the housing and a housing outlet proximate a bottom end of the housing, the housing including at least one vent wall forming a plurality of vent apertures proximate the top end of the housing where the vent apertures are generally smaller than the particulate size and a cover member mounted to the housing, the cover member extending to a side of the vent wall opposite the cavity, including a cover wall that is spaced apart from the vent wall, substantially enclosing the vent wall and forming at least one exhaust outlet.

Moreover, the invention includes an assembly for pneumatically transporting particulate from a main hopper to a metering device where the main hopper includes a particulate outlet and the metering device includes a meter inlet, the assembly comprising an air source operably linked to the hopper outlet to entrain particulate at the hopper outlet in an air stream, a transport duct having a duct inlet and a duct outlet, the duct inlet operably linked down stream of the hopper outlet to receive the particulate entrained air stream from the source and a housing including walls that form a cavity, a hopper inlet linked to the duct outlet and a hopper outlet linked to the metering device inlet, at least one of the housing walls forming a vent configured to trap particulate while allowing air to pass there through.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 1 is a is perspective view of a preferred embodiment of a planter apparatus constructed in accordance with one embodiment of the present invention;

FIG. 2 is a top plan view of the carrier frame of illustrated in FIG. 1;

FIG. 3 is a bottom plan view of the carrier frame illustrated in FIG. 1;

FIG. 4 is a perspective view of a mainframe assembly used with the configuration of FIG. 1;

FIG. 5 is a top plan view of the embodiment of FIG. 1 in an extended operating position;

FIG. 6 is a top plan view of the embodiment of FIG. 1 in a transport position;

FIG. 7 is a perspective view of the embodiment of FIG. 1 in an intermediate position with an implement between the operating and the transport positions;

FIG. 8 is a rear perspective view of the embodiment illustrated in FIG. 1 with storage units attached and in the transport position;

FIG. 9 is a perspective view of the embodiment of FIG. 8 with storage units in the transport position;

FIG. 10 is a schematic illustrating a delivery system according to the present invention;

FIG. 11 is a perspective view of several of the components that comprise a row unit including a mini-hopper;

FIG. 12 is a partial perspective view of the mini-hopper of FIG. 11 where internal hopper surfaces are illustrated in phantom;

FIG. 13 is a partial exploded view of the mini-hopper of FIGS. 11 and 12 in an inverted position;

DETAILED DESCRIPTION OF THE INVENTION

Referring now to FIGS. 1 through 4, a preferred embodiment of the present invention will be described in the context of an agricultural assembly 10 which includes a carrier frame assembly 12, a main frame assembly 69 and a planter assembly 15. As its label implies, carrier frame assembly 12 includes components configured to facilitate transport or carrying of other assembly 10 components. Similarly, as their labels imply, main frame assembly 69 includes components configured to generally support any of several different implement assemblies while planter assembly 15, includes components used to plant seeds. Main frame assembly 69 is mounted to carrier frame assembly 12 and planter assembly 15 is mounted to main frame assembly 69.

Figure 3:
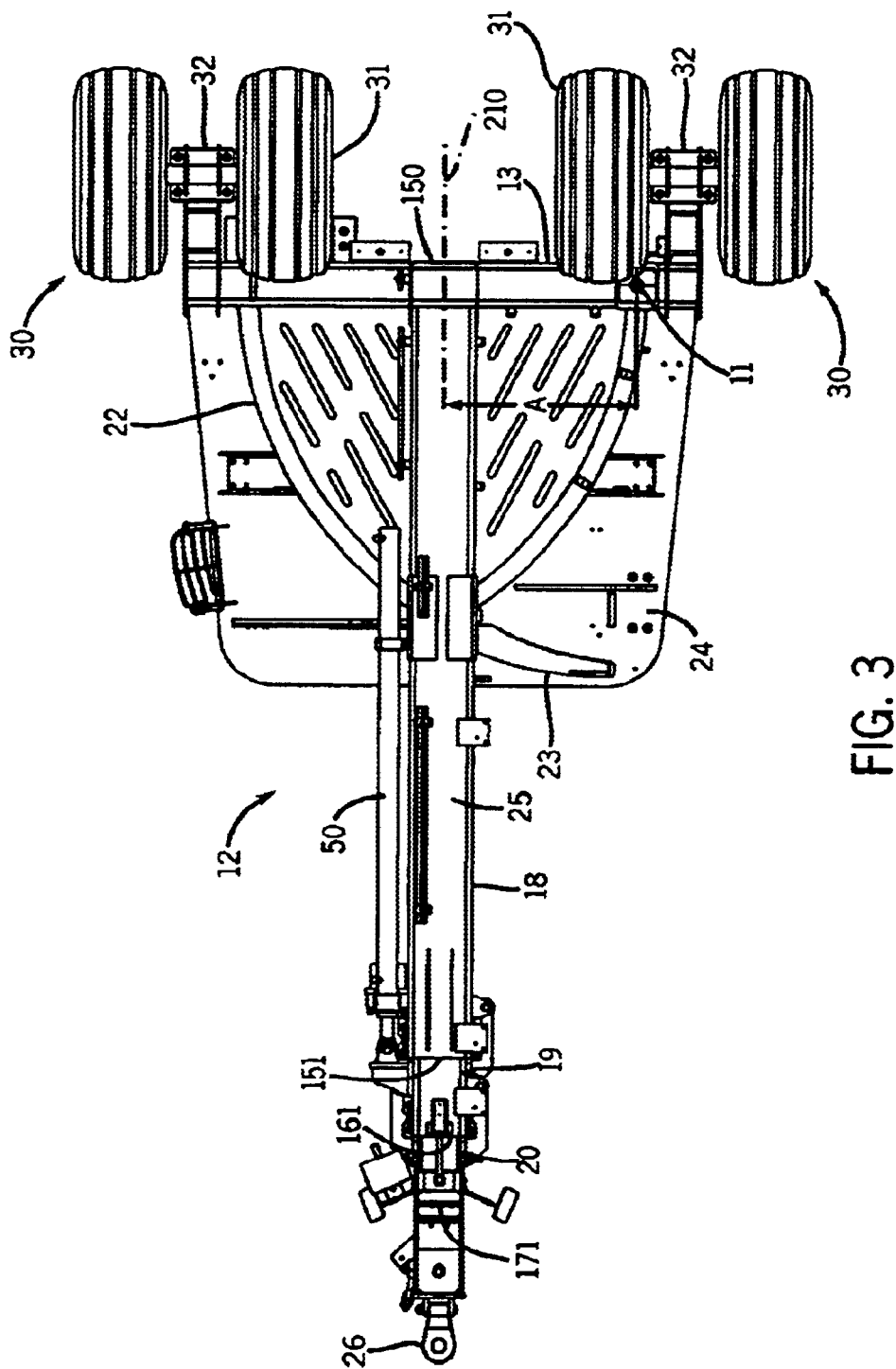
Figure 4:
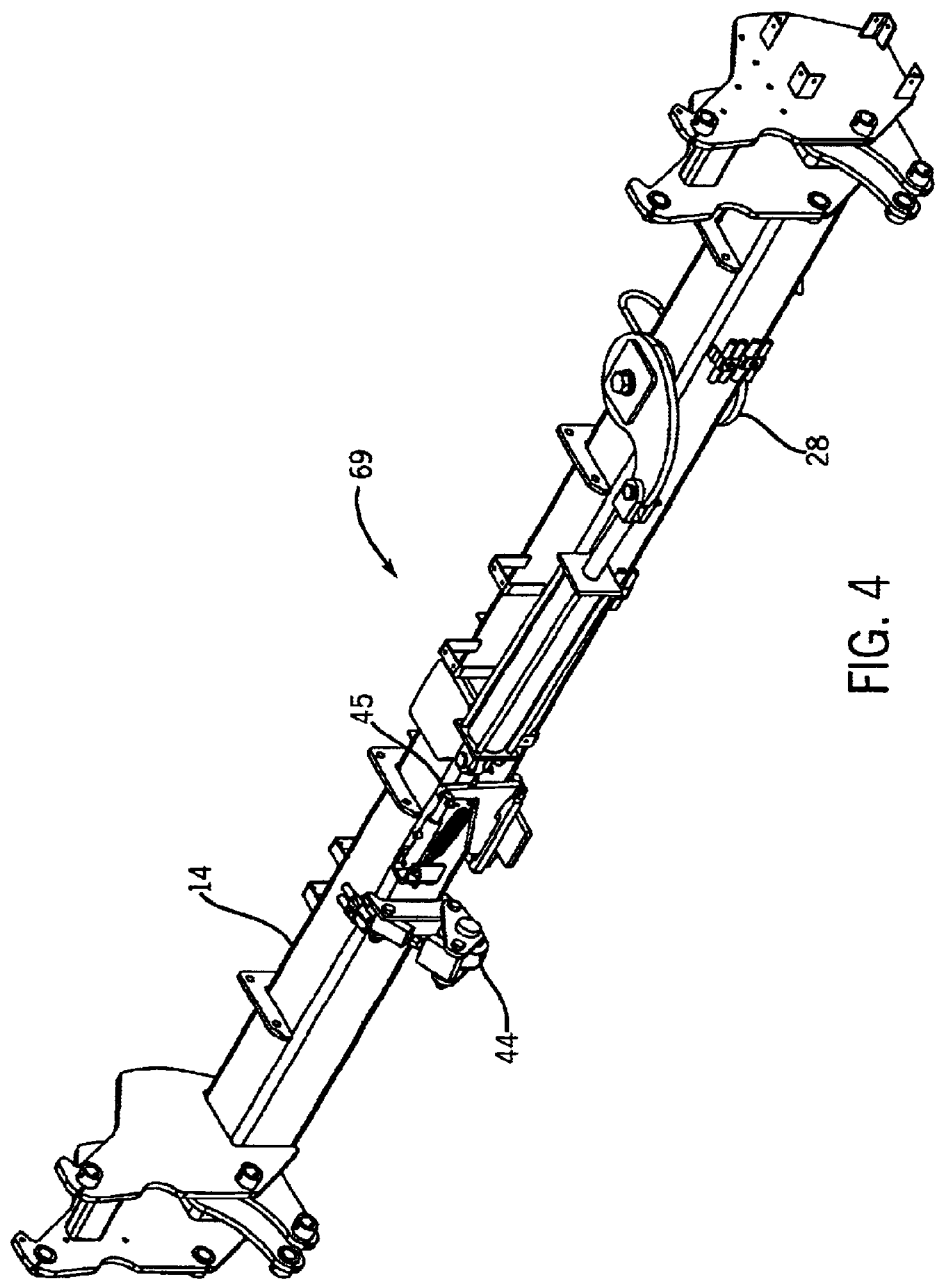
Figure 5:
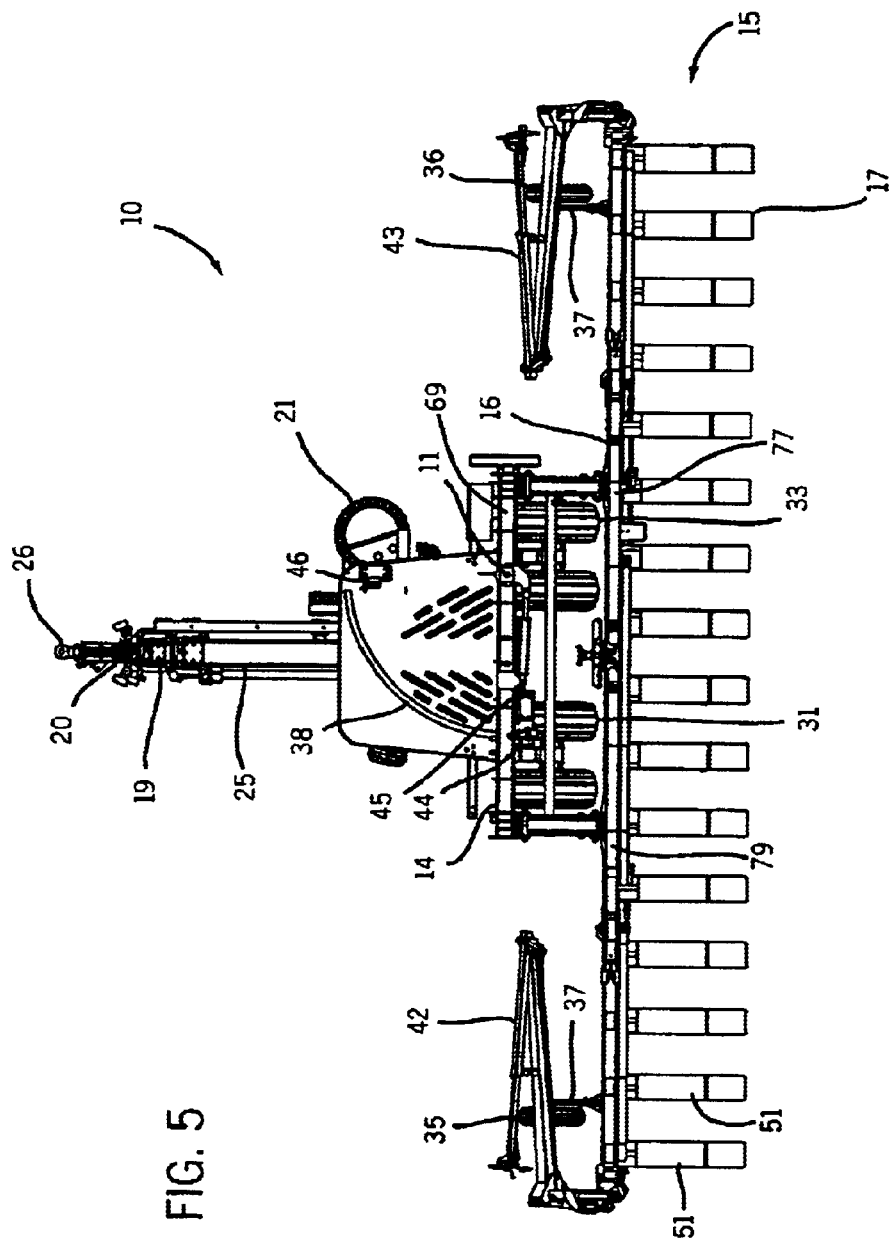

Referring still to FIGS. 1 through 4 and also to FIG. 5 (and generally to other Figures in the specification), the exemplary planter assembly 15 includes an implement bar 16, row units 17, support wheels 35, 36, wheel support members 37, extendable markers 42, 43 and a plurality of seed delivery ducts or hoses that are bundled into two delivery sheaths 77 and 79. Implement bar 16 is typically a rigid steel rectilinear bar having dimensions within the six by six, to ten by ten range and extends along the length of implement assembly 15. Bar 16 is generally mounted to main frame assembly 69 in a manner described below.

Wheels 35 and 36 are mounted via wheel support members 37 at opposite ends of bar 16 and are generally positionable in two positions with respect to the ground (not illustrated). First, as illustrated in the figures, wheels 35 and 36 and/or the entire implement assembly 15 may be manipulated via hydraulic cylinders or the like such that wheels 35 and 36 are in an upright position where the wheels 35 and 36 clear the ground below. Second, wheels 35 and 36 or the entire implement assembly 15 may be manipulated such that wheels 35 and 36 contact the ground below and support the ends of the implement assembly there above with implement components either above the ground or, depending on implement type, perhaps partially engaging the ground.

Markers 42 and 43, like wheels 35 and 36, are mounted at opposite ends of bar 16 and generally extend from bar 16 to a front side (see FIGS. 1, 5, etc) of the implement assembly. Operation of markers 42 and 43 is well known in the art and therefore will not be explained here in detail. Suffice it to say markers 42 and 43 may assume either a stored position (see FIG. 5) where the markers are generally retracted or an extended and operating position (not illustrated) where the markers 42 and 43 are unfolded and extend at least in part in the direction away from units 17 and toward a tractor (not illustrated) that may be attached to assembly 10. Row units 17 and delivery sheaths 77 and 79 are described in more detail below.

Figure 6:
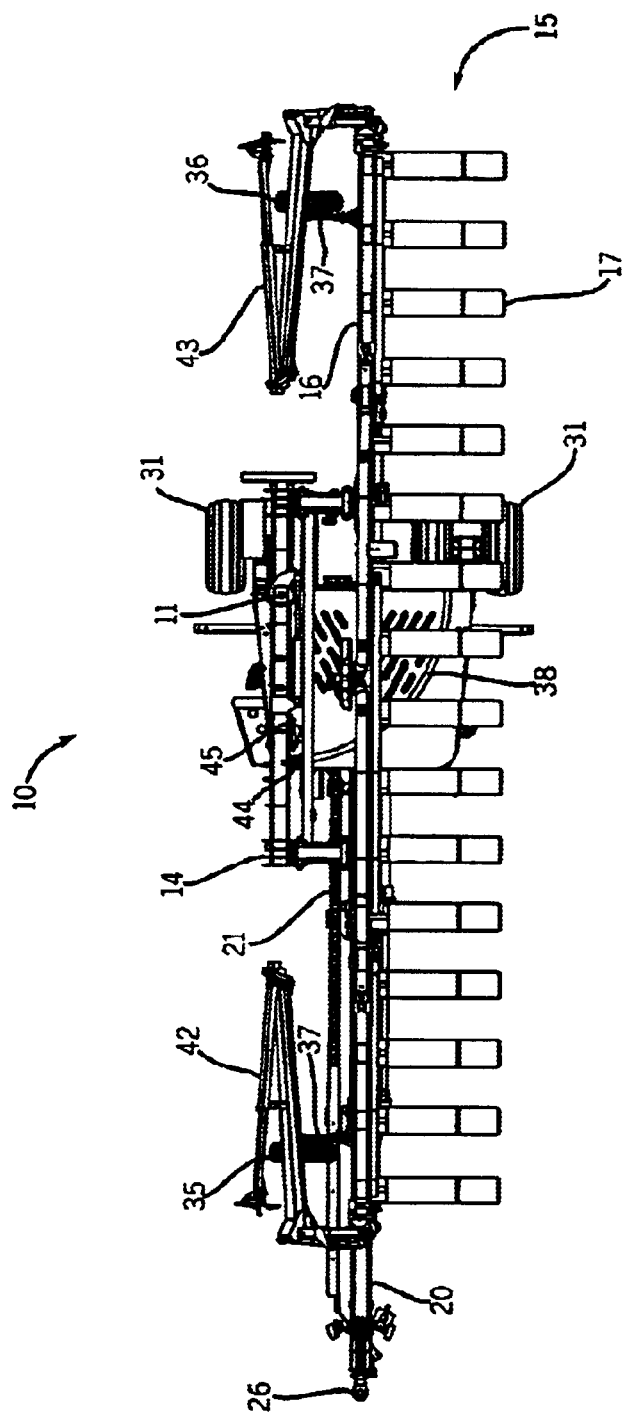

Referring now to FIG. 4, the main frame assembly 69 includes, among other components, a main frame bar member 14, a roller assembly 44, a latching assembly 45 and a pivot plate 28. Pivot plate 28 is mounted to an undersurface of bar member 14 about one-fourth the length of bar member 14 from a first end thereof and forms a downwardly opening pivot receiving aperture (not observable in the FIGS.) for receiving a carrier frame assembly pivot pin (see 34 in FIG. 2) which is described in more detail below. Latch assembly 45 cooperates with other system latching components (e.g., see two instances of latch 46 in FIG. 2) mounted on the carrier frame assembly 12 to lock the main frame assembly 69 and attached implement assembly 15 in either a transport position (see FIGS. 6, 8 and 9) or an operating position (see FIGS. 1 and 5). Precise configuration and operation of assembly 45 is not explained here in the interest of simplifying this explanation.

Roller assembly 44 is mounted to bar member 14 at a point about one-fourth the length of bar 14 from a second bar 14 end (not numbered) and includes at least one roller mounted for rotation in a direction substantially perpendicular to the length of bar member 14 and that is formed so as to be supportable on a track runner (e.g., 38 in FIG. 2) formed by a carrier frame platform (see platform 24 in FIGS. 2 and 3) that is explained in greater detail below. Thus, plate 28 and assembly 14 are, in the present example, essentially equi-spaced along the length of bar 14. Positioning of plate 28 and wheel assembly 44 is important to ensure proper balancing of the attached implement assembly 15 and is generally a function of how best to balance assembly 15 about a carrier assembly axis 210 (see FIG. 2).

Although not illustrated, assembly 10 further includes first and second lift cylinders and corresponding first and second pivoting brackets 124, 126 (see FIGS. 1 and 9) that are constructed so that opposite ends of each bracket 124, 126 are pivotally securable to the main frame bar member 14 and the implement bar 16. The first and second lift cylinders each includes a rod end and a base end and opposite ends are linked to the mainframe bar member 14 and the implement bar 16 such that, when the cylinders are retracted, the implement bar 16 and linked components are lowered into a functional and ground engaging position (illustrated in FIG. 1) and, when the cylinders are extended, implement bar 16 is raised into a transport and ground clearance position illustrated in FIGS. 8 and 9. When in the functional position, various components of each row unit 17 engage or at least interact with the ground there below in a manner to be described in more detail below.

Figure 1:
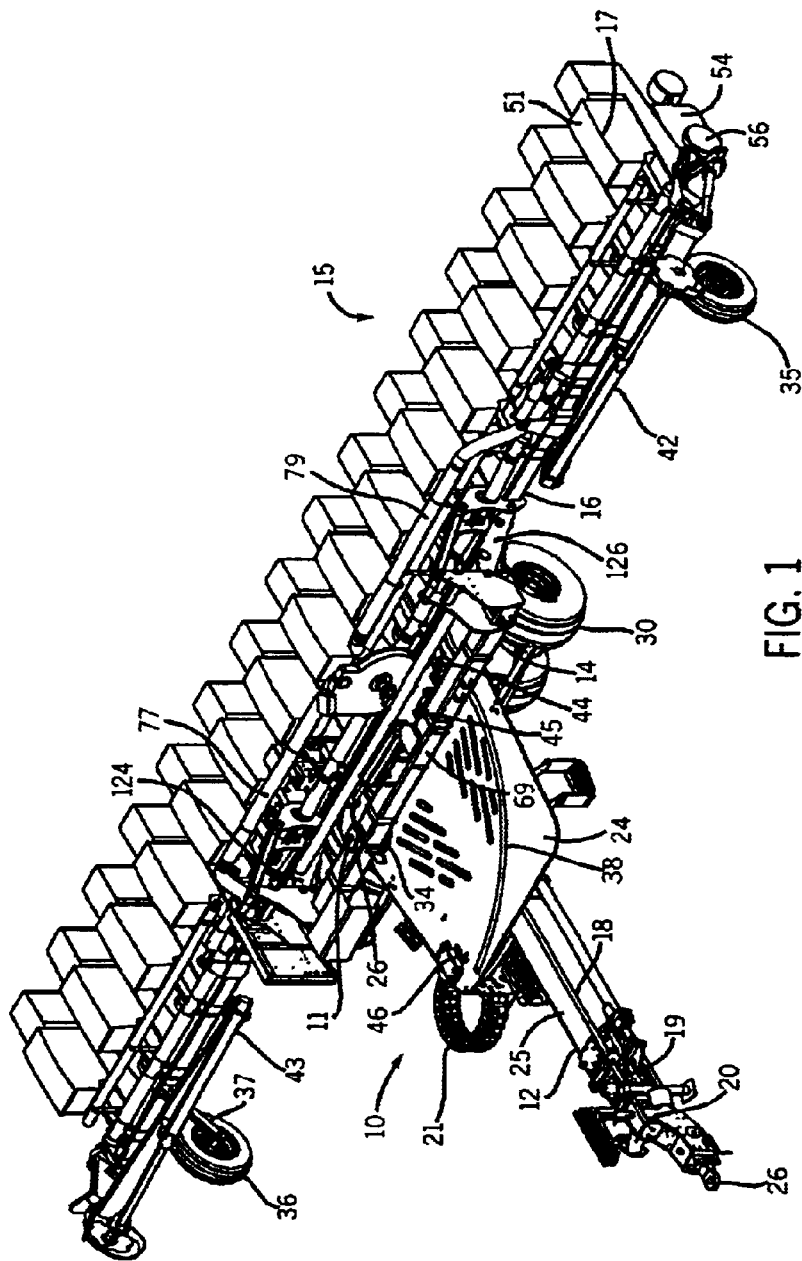
Figure 8:
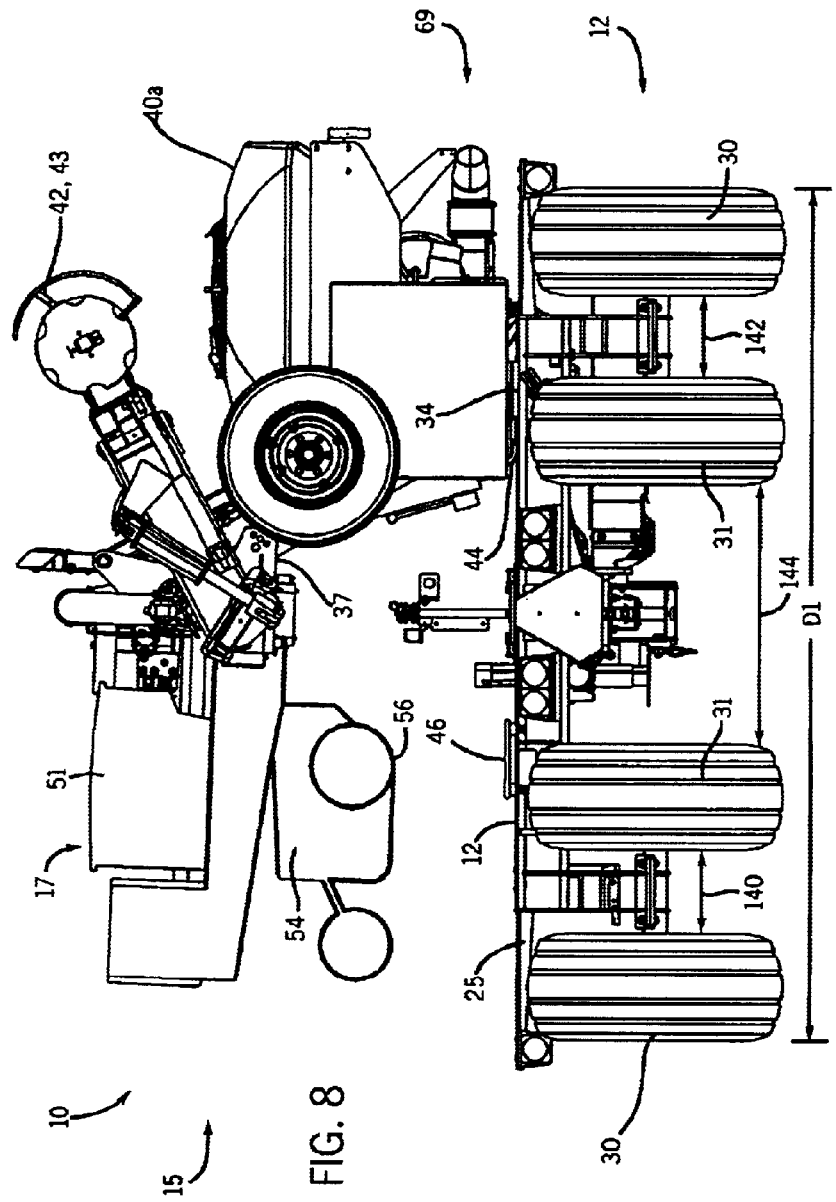

Referring still to FIGS. 1 and 8, exemplary assembly 10 includes sixteen row units 17 equi-spaced along the length of bar 16. As well known in the art each unit 17 includes some type of aligning structure 51, a mini-hopper 52 (described in more detail below), some type of soil agitator 56 (e.g., a coulter or spade of some type) and a seed metering device 54. The alignment structure 51 is provided for legacy planter assembly reasons. More specifically, early planter assemblies included a separate relatively large hopper mounted on top of each row unit instead of a mini-hopper 52 for delivering seed to a metering device there below. The large hoppers were removable and replaceable. To this end, although not illustrated, for each large hopper, the planter implement bar was fitted with a hopper receiving assembly that would properly align the hopper with the metering device there below and that would secure the hopper in place. Similarly, the underside of the hopper was configured to cooperate with the hopper receiving assembly to align and lock the hopper in a desired position.

For various reasons (e.g., reduce filling time, reduce component costs, etc.), the large hoppers have been replaced by the smaller mini-hoppers. Nevertheless, to allow the mini-hoppers to be retrofitted to existing planter assemblies, the mini-hoppers have been fitted with support structures 51 that are designed to have undersides that are similar to the undersides of the large legacy hoppers. It should be appreciated that the aligning structures 51 are not directly related to novelty of the present invention and that the invention could be practiced without a legacy type aligning structure.

Figure 11:
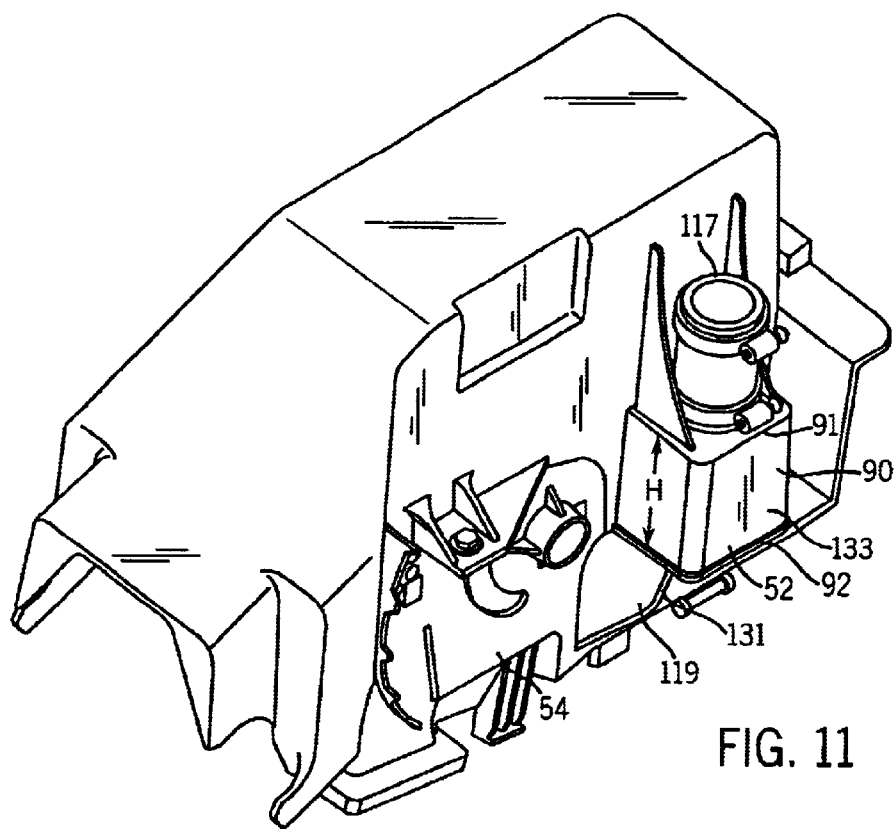

As indicated above, the aligning structures 51 secure corresponding mini-hoppers 52 above associated metering devices 54 (see FIG. 11). In addition, a separate agitator 56 is mounted to the metering devices such that the agitator is directly in front of a lower end of a corresponding metering device 54 when the assembly 10 is pulled through a field. As assembly 10 is pulled through a field, agitators 56 each form a trench into which a corresponding metering device 54 deposits seeds.

Referring to FIG. 8, support wheels 31 are separated and form spaces 140, 142, 144, etc., that, as assembly 10 is pulled through a field, travel along paths that are between crop rows being formed. Referring also to FIG. 1, row units 17 are positioned on bar 16 such that units directly behind a dimension D1 formed by the wheels 31 form rows between the wheels. For instance, one row unit 17 may be mounted to bar 16 so that a resulting row is formed within the space defined by the paths formed by the left two wheels as illustrated, another row unit 17 may be mounted to bar 16 so that a resulting row is formed within the space defined by the paths formed by the right two wheels as illustrated and perhaps two row units may be mounted to form two rows in the space between paths defined by the center wheels.

Figure 9:
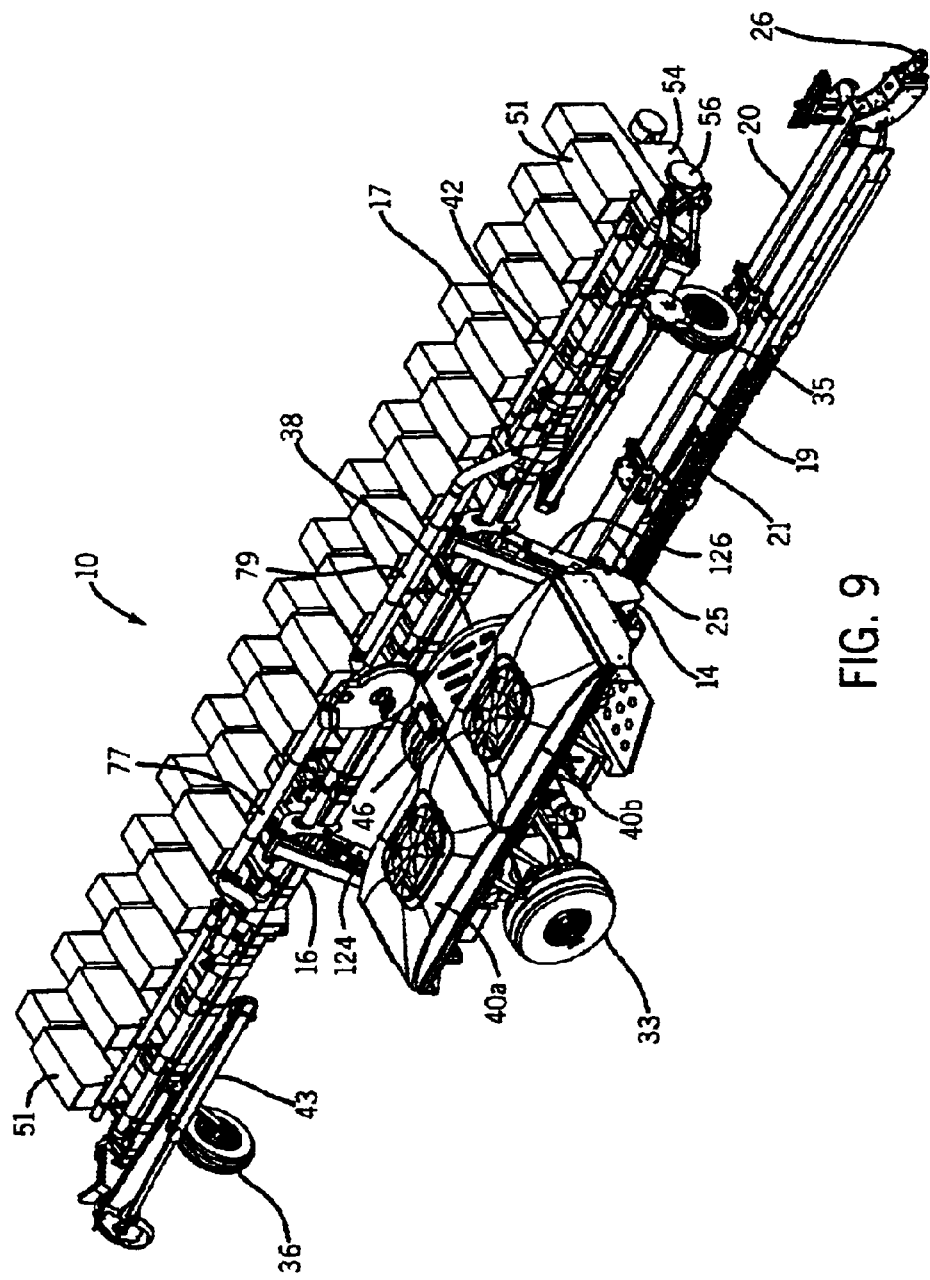

Referring now to FIGS. 8 and 9, in addition to the components described above, assembly 10 further includes two main hoppers 40*a* and 40*b* secured to main frame bar 14 that feed seed to a delivery system that pneumatically delivers seed to the mini-hoppers 52. To this end, referring also to FIG. 10, a simplified and exemplary pneumatic delivery system includes, among other things, a fan or blower of some type 60, a seed/air mixer 83*a*, 83*b* for each main hopper 40*a*, 40*b*, respectively, and the delivery hoses that are bundled inside delivery sheaths 77 and 79 (see also FIG. 1). There are sixteen separate delivery ducts or hoses, a separate hose for each of the row units 17. The hoses will be referred to collectively and/or individually via reference numeral 76 hereinafter.

Figure 10:
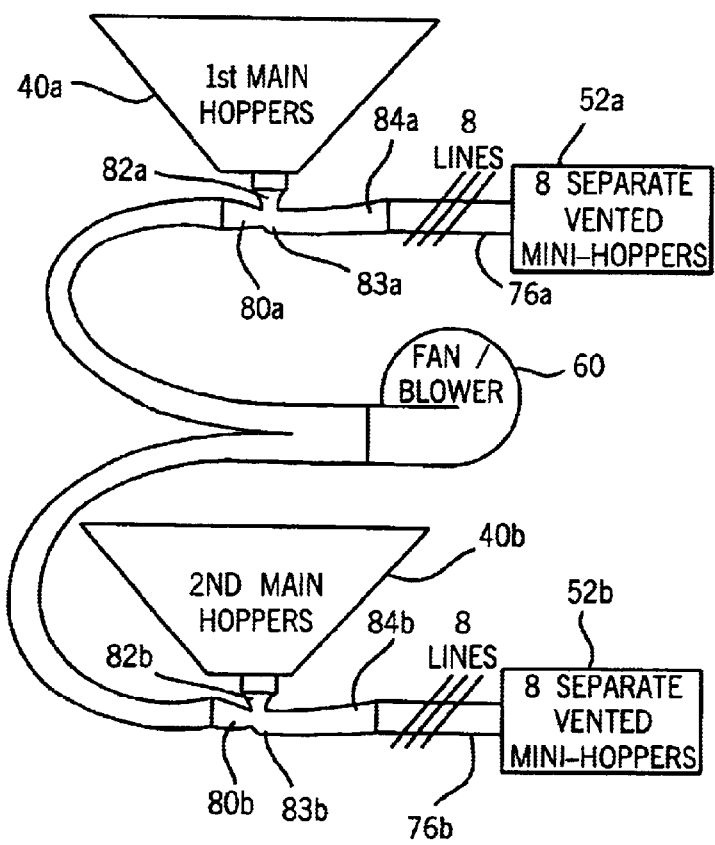

The delivery system components corresponding to each main hopper 40*a* are similar and operate in a similar fashion and therefore, in the interest of simplifying this explanation, only the components corresponding to main hopper 40*a* will be described here. Here, it should suffice to say that each of hoppers 40*a* and 40*b* and corresponding components feed eight separate mini-hoppers. As illustrated in FIG. 9, main hopper 40*a* would likely feed the eight leftmost mini-hoppers while main hopper 40*b* would likely feed the eight right most mini-hoppers. Hoses linked to main hoppers 40*a* and 40*b* are bundled within sheaths 77 and 79, respectively. In FIG. 10, similar components corresponding to the two main hoppers 40*a* and 40*b* are identified via similar numbers followed by lower case letters "a" and "b", respectively.

As best illustrated in FIG. 10, mixer 83a generally receives both air and seed, entrains the seed within the air and directs the entrained seed-air flow through hoses 76 to eight separate mini-hoppers 52. In the exemplary mixer 83*a* it will be assumed that mixer 83*a* divides received forced air into eight separate air flows, directs those air flows proximate outlets in the bottom of the hopper 40*a* such that the air flows entrain seed therein and then directs the entrained seed to eight separate mini-hoppers 52*a* through hoses 76*a*. To this end, mixer 83*a* includes a single forced air inlet 80*a*, eight seed inlets 82*a* and eight air-seed outlets 84. Fan 60 provides forced air at inlet 80*a* which mixer 83*a* divides into eight separate air flows. Each seed inlet 82*a* provides seed to a corresponding air flow causing the seed to be entrained and each outlet 84*a* is linked to a separate hose 76*a* and corresponding mini-hopper 52*a*. Other mixer and hose configurations are contemplated.

While fan 60 could be mounted to either the main frame bar 14 or implement bar 16, here it will be assumed that, like main hoppers 40*a* and 40*b*, fan 60 is mounted to main frame bar 14 thereby reducing the weight supported by bar 16.

Referring to FIGS. 1, 2, 3 and 5, carrier frame assembly 12 generally includes a cross bar 13, two wheel assemblies 30, a draw bar assembly 18 and platform 24. Each wheel assembly 30 includes an axle support member 32 and a pair of support wheels 31 mounted on opposite sides of a corresponding support member 32. As best seen in FIG. 8, the support wheels 31 define support dimension D1. Dimension D1 is wide enough that the entire planter assembly 10 is laterally stable but should be limited to a size that is accommodated by a typical roadway. For instance, dimension D1 may be between 10 and 15 feet.

Cross bar 13 is a steel elongated bar. A separate one of wheel assemblies 30 is mounted at each one of the cross bar 13 ends and extends downward there from so that assemblies 30 support cross bar 13 above ground. A pivot pin 34 is provided that extends upwardly from a top surface of bar 13. Pin 34 is formed about a vertical axis 11 and is formed so as to be receivable by the downwardly facing opening formed by pivot plate 28 (see FIG. 4) for rotation thereabout.

Figure 2:
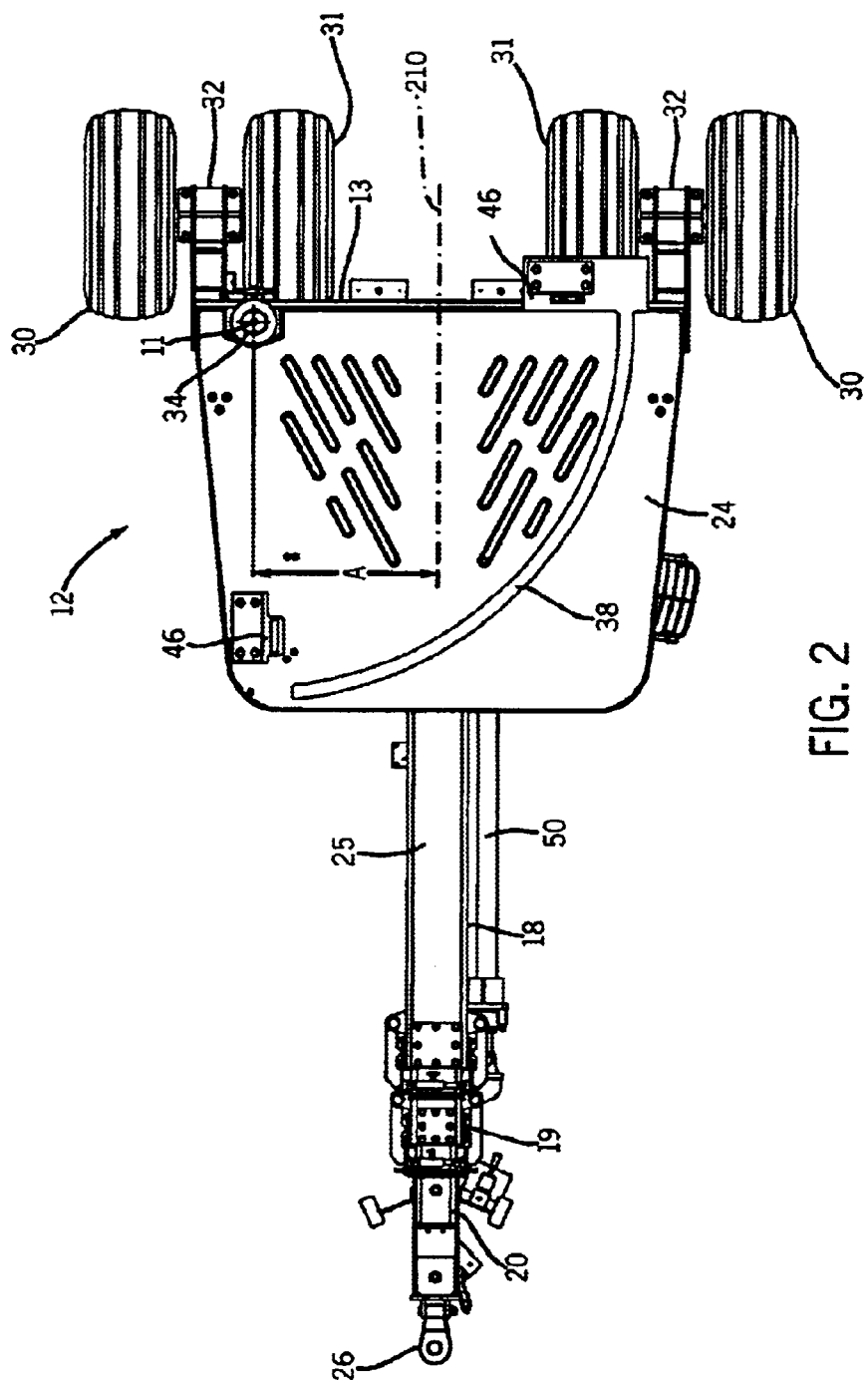

Referring to FIGS. 2 and 3, draw bar assembly 18 is a two stage tongue assembly. Assembly 18 is described in great detail in the Planter Hitch Apparatus patent application referenced above and which has been incorporated herein by reference and therefore apparatus 18 will not again be described here in detail. Suffice it to say at this time that, among other components, assembly 18 includes a first tongue member 25 having first and second ends 150 and 151 and forming a first passageway (not illustrated). As best seen in FIG. 3, first tongue member 25 is secured at its first end 150 to a central point of cross bar 13 via welding or some other suitable securing process. In addition, assembly 18 further includes second and third tongue members 19 and 20, respectively, and includes two tongue cylinders (only one shown at 50, the second tongue cylinder internally disposed within the tongue assembly). Second member 19 is receivable within first tongue member 25 and first tongue member 20 is receivable within second tongue member in a telescoping manner such that, when retracted, distal ends 171, 161 and 151 of members 20, 19 and 25, respectively, are adjacent each other. Members 19 and 25 are driven by cylinder 50 and the internally mounted cylinder between the retracted and operating configuration illustrated in FIG. 3 and the extended and transport configuration illustrated in FIG. 9. A hitch member 26 is mounted to the distal end 171 of tongue member 20 for linking assembly 10 to a prime mover like a tractor.

Figure 12:
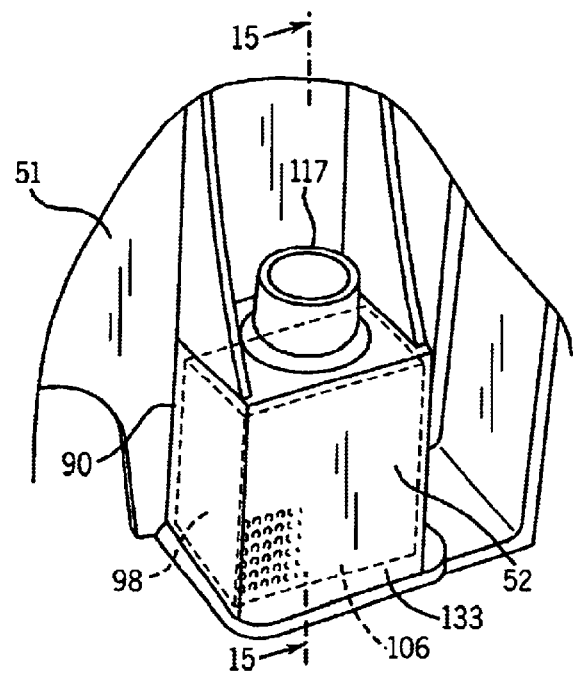

Referring to FIGS. 2, 3, 8, platform 24 is essentially a rigid flat bed member that is secured to a top surface of cross bar 13 and approximately half of first tongue member 25 proximate cross bar 13. Referring also to FIGS. 11 and 12, additional support bars 62 may also be provided to support platform 24. Among other features, platform 24 forms a track runner 38 on a top surface which is reinforced on a platform undersurface (see FIG. 3) via supporting tracks 23 and 22 or in any other manner known in the art. Pivot pin 34 extends through an opening in platform 24. Referring also to FIG. 4, track runner 38 forms an arc about pivot pin 34 having a radius dimension that is identical to the space dimension between pivot plate 28 and roller assembly 44 on bar 14. Runner :38 is dimensioned so as to securely support the roller of assembly 44 in any position along the runner and thereby provide support to main frame bar 14 there above.

Referring still to FIGS. 2 and 4, transport and operating implement locking brackets or latches 46 are also provided on the top surface of platform 24. A transport bracket 46 is generally spaced from pivot pin 34 along a line parallel to the length of first tongue member 25 while an operating bracket 46 is generally spaced from pin 34 on the side of first tongue member 25 opposite pin 34. Each bracket 34 is formed so as to securely receive and lock to latch assembly 45 to lock the main frame assembly 69 and other components secured thereto to platform 24 in either the transport or operating positions.

Referring now to FIGS. 1, 2, 4 and 8, with carrier frame assembly 12 assembled and implement assembly 15 secured to the main frame assembly 69 as described above, the main frame bar 14 is positioned such that pin 34 is received in the opening formed by plate 28 and with the assembly 44 roller supported on runner 38. Gravity maintains main frame assembly 69 on runner 38 and some type of collar (not illustrated) on pin 34 may be provided to further ensure that assembly 69 remain secured. With wheels 35 and 36 and/or the implement assembly manipulated so that the wheels 35, 36 are off the ground, the entire main frame bar 14 and components attached thereto are moveable between the transport position illustrated in FIG. 9 to the operating position illustrated in FIG. 1 and to any intermediate position there between (see FIG. 7) by simply rotating main frame bar 14 about pivot pin 34.

As indicated above, when in either the transport or operating positions, latch assembly 45 and one of brackets 46 cooperate to lock main frame bar 14 to carrier assembly 12 to eliminate relative movement during transport. Any means for rotating bar 14 about pin 34 may be employed. Similarly, any means for operating latch assembly 45 and for raising and lowering the implement assembly and/or the lateral support wheels 35, 36 may be employed.

Figure 7:
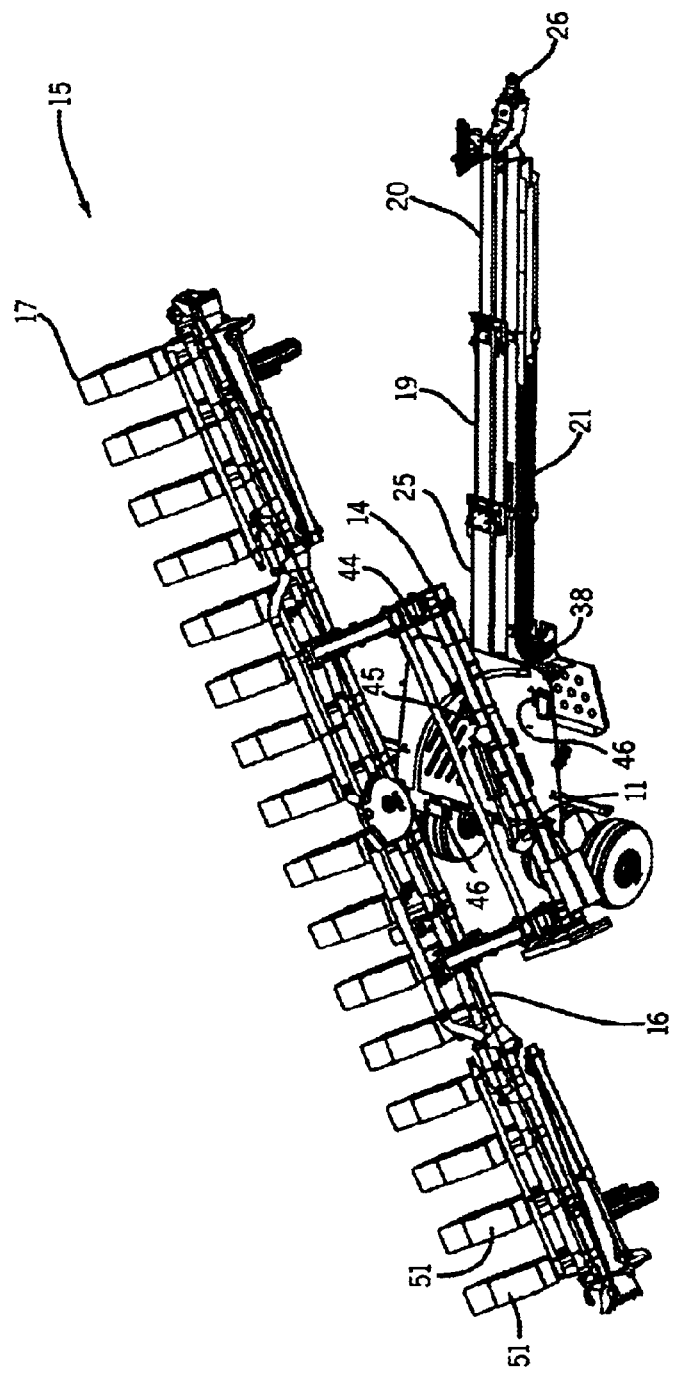

Referring again to FIG. 1 where the assembly is shown in the operating position, consistent with reducing the number of required headland passes needed to perform an agricultural task for an entire field, the cross bar assembly 18 is relatively short. Referring also to FIGS. 7 and 9, however, it can be seen that, in order to accommodate a long implement configuration in the transport position, the tongue assembly has to be extended.

The mini-hoppers 52a and 52b all have similar configurations and operate similarly and therefore, in the interest of simplifying this explanation, only a single mini-hopper 52a will be described here in detail. Referring now to FIGS. 8 and 10 through 16, mini-hopper 52a includes a housing 90 that has top and bottom ends 91 and 92, respectively, and a plurality of walls that together define a seed receiving/storage cavity 94 (see FIG. 14 for best view of cavity 94). Cavity 94 is generally defined by a top wall 96, and four side walls 98, 102, 104 and 106 where the bottom end 92 is generally open. While walls 98, 102 104 and 106 may have various dimensions, in at least one embodiment the side walls have a height dimension H (see FIG. 11) between ends 91 and 92 that substantially corresponds to a seed depth that will completely block the force of the seed and air being deposited in cavity 94 from being conveyed to metering device 54 therebelow. For instance, height H may be one to five inches or more or, where a duct 119 therebelow accumulates seeds that contribute to a seed head, may even be less. Side wall 106 forms a large number of relatively small apertures collectively identified by numeral 112 where apertures 112 are generally dimensionally smaller than the typical dimension of seed to be delivered to the mini-hoppers (i.e., the seed generally cannot pass through apertures 112). In this regard wall 106 may comprise a perforated metal sheet or plastic member or a screen of some type.

In the illustrated embodiment wall member 106 is removable. To this end, first and second rib pairs 108 and 109, respectively, are formed in opposing walls 104 and 102 that define a member receiving space therebetween that is dimensioned to receive wall member 106. Each pair 108 and 109 includes two parallel ribs that extend toward the opposing wall.

Figure 13:
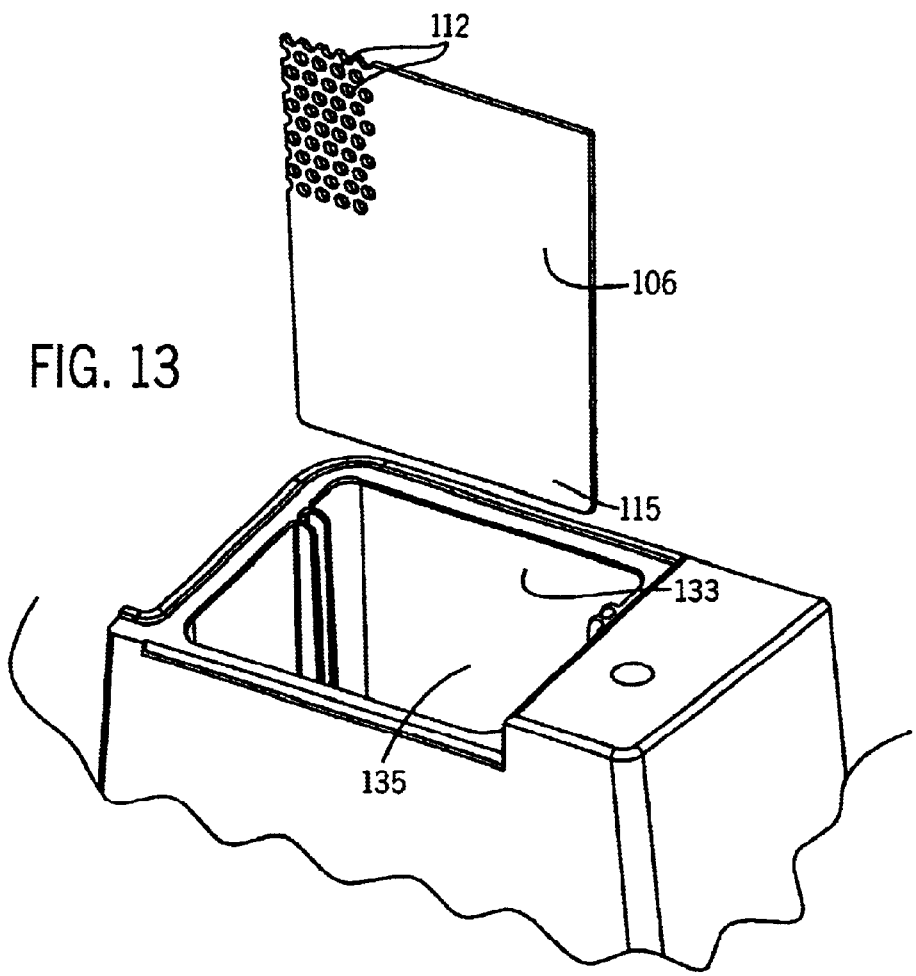
Figure 14:
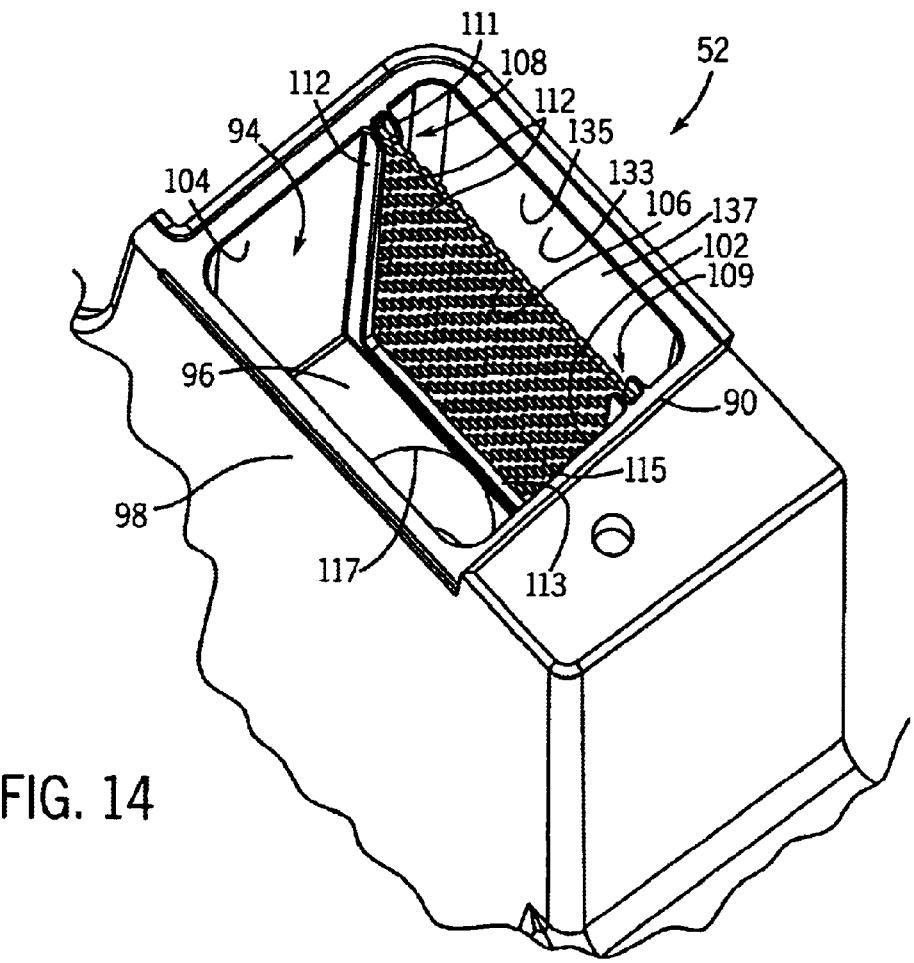
FIG. 14 is similar to FIG. 14, albeit with a perforate wall installed in the mini-hoppers.

For instance, pair 108 includes parallel ribs 111 and 112 that extend toward wall 102. The ribs run along the entire height of each wall 104 and 102 from the top end 91 to the bottom end 92. A similar rib pair 113 is provided on the inside surface of top housing wall 96 that connects the top ends of rib pairs 108 and 109 and that receives a top end 115 of wall member 106. Thus, as configured and as illustrated in FIG. 13, wall member 106 can be installed and removed from housing 90 by sliding member 106 between pairs 108 and 109 and in and out of open bottom end 92 when mini-hopper 52a is removed from structure 51. This removable feature is important as, depending on seed or particle size, wall member 106 may have to be replaced to provide larger or smaller apertures 112.

Referring still to FIGS. 10 through 16, a supply hose 76a opens downwardly through inlet 117 in top wall 96 into cavity 94. In at least one embodiment the combined cross-sectional area of apertures 112 is greater than the cross-sectional area of inlet 117 so that wall 106 minimally impedes air flow through the connected supply hose and into cavity 94.

When structure 51, mini-hopper 52a and metering device 54 are secured together to form a functional assembly, a duct member 119 is aligned directly under cavity 94 and, in the illustrated embodiment, includes an outer wall 131 having an upper lip or edge 171 (see FIG. 15) that is aligned directly under wall member 106. In this manner the upper edge of wall 131 maintains wall member 106 in its operating position by prohibiting downward movement. Duct member 119 opens at a lower end (not illustrated) into metering device 54 to provide seed from mini-hopper 52a thereto.

In addition to the structure above, mini-hopper 52a also includes a cover member 133 mounted to housing 90 and that extends to the side of wall 106 and rib pairs 108 and 109 opposite cavity 94. Cover member 133 includes a cover wall 135 that is essentially parallel to wall 106 and is spaced apart from wall 106. The top and side edges of cover member 133 are integrally formed with and sealed against top wall 96 and side housing walls 104 and 102 while the bottom end of member 133 is open thereby forming an exhaust outlet 137 (see FIG. 14).

Thus, referring to FIG. 11, cover member 133 completely seals and encloses perforated wall 106 from above but provides a downwardly opening exhaust outlet below wall 106. This design minimizes the possibility of moisture (e.g., rain) entering mini-hopper 52a from above which can destroy seed therein. Because duct wall 131 that leads from cavity 94 to the metering device is aligned with wall 106, exhaust outlet 137 opens to the ambient.

Figure 15:
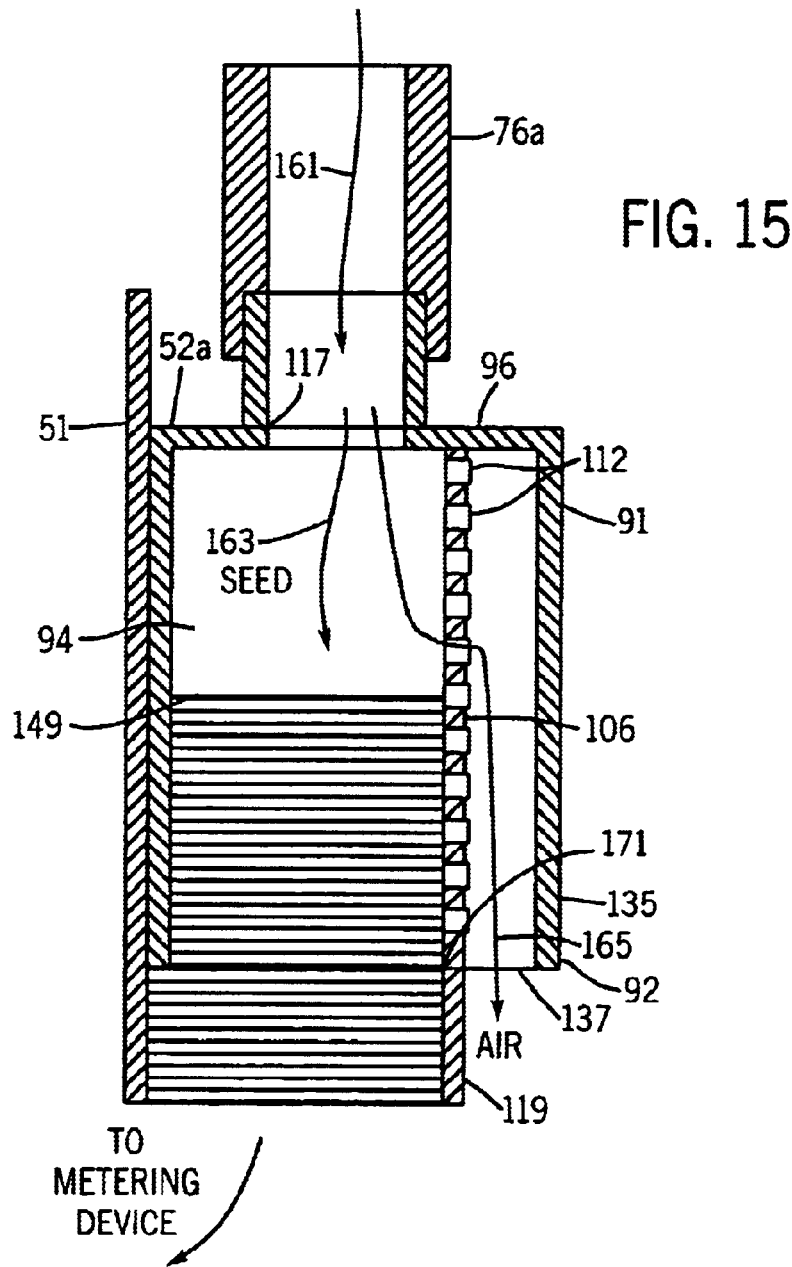
FIG. 15 is a cross-sectional view taken along the line 15—15 of FIG. 12 showing a partially filled mini-hopper.

In operation, referring to FIG. 15, prior to mini-hopper 52a being filled (see seed-accumulation line 149 in FIG. 15) with seed entrained air being provided to cavity 94 via inlet 117 along the path identified by numeral 161, at a rate faster than the rate at which metering device 54 is removing seed from cavity 94, delivered seed 163 accumulates in cavity 94 and air from the flow exists cavity 94 via apertures 112 and exhaust outlet 137 along the path identified by numeral 165.

Figure 16:
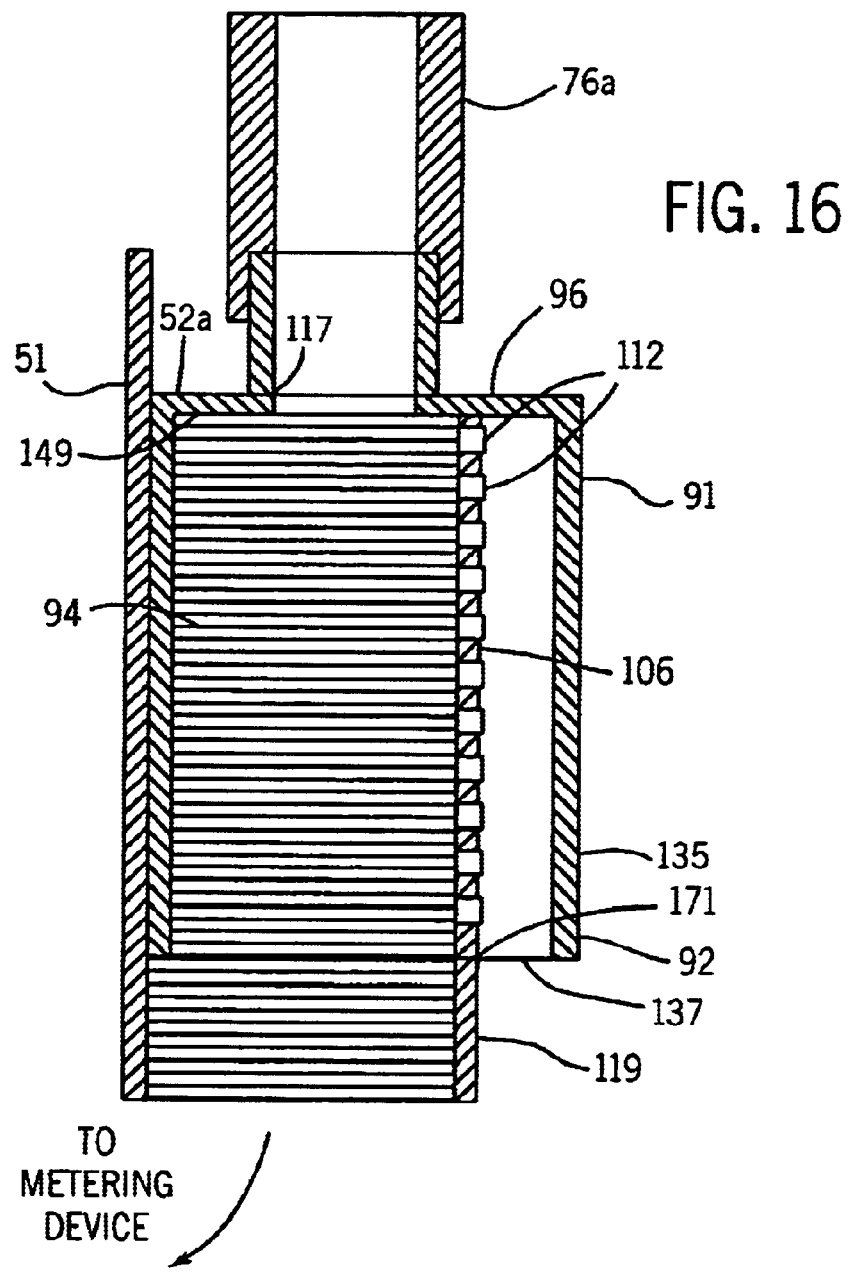
FIG. 16 is similar to FIG. 15, albeit showing a filled mini-hopper.

Referring to FIG. 16, eventually, seeds accumulated in cavity 94 fill up cavity 94 (see seed level 149 in FIG. 16) and all of apertures 112 become blocked. Once all apertures 112 are blocked, seed delivery via hose 76a to the mini-hopper 52a ceases. Metering device 54 continually distributes seed and thus removes seed through the force of gravity from cavity 94 above. When sufficient seed has been distributed, the seed level within cavity 94 drops until at least the apertures 112 at the top end (see 115 in FIG. 13) of wall member 106 are unblocked. At that time seed delivery to mini-hopper 52a again commences and continues until all apertures 112 are again blocked. This re-filling process continues over and over again until either main hoppers 40 are empty or the planter assembly is deactivated.

While the drawings, specific examples and particular formations described above teach exemplary embodiments of the present invention, they only serve the purpose of illustration and the materials and configurations shown and described may differ depending on the chosen performance characteristics and physical characteristics of the planter equipment. For example, referring to FIG. 14, while wall member 106 is illustrated as being removable and replaceable, in some embodiments wall 106 may be integrally formed with the other housing walls so that member 106 would not be removable. In addition, while wall member 106 is illustrated as being completely perforated, other embodiments are contemplated including one where the apertures 112 would only be provided at the top end 115 and less or perhaps no apertures 112 will be provided at the opposite lower end of wall member 106. In this case, the mini-hopper 52 would operate in a manner similar to the manner described above. Moreover, while not ideal, an embodiment is contemplated that would not include a cover member 133 so that perforated wall member 106 would be open to the ambient. Furthermore, apertures 106 may be provided in any of the housing walls including each of side walls 98, 102 and 104 as well as top wall 96. In any of these cases, the embodiment may or may not include a cover member 133. Moreover, it is further contemplated that the apertures 106 may be provided in more than one of the housing walls.

To apprise the public of the scope of this invention, the following claims are made:

What is claimed is:

1. An apparatus for use with a pneumatic particulate transport assembly, the assembly including a transport duct having a duct outlet and a particulate metering device having a meter inlet, the apparatus for receiving particulate from the transport duct and temporarily storing the particulate for use by the metering device where the particulate is characterized by a particulate size, the apparatus comprising:

a housing including walls that form a cavity, a housing inlet linkable to the duct outlet and a housing outlet linkable to the metering device inlet, wherein the housing forms the housing inlet in a top wall and a downwardly opening housing outlet, at least one of the housing walls forming vent apertures that are generally smaller than the particulate size, and wherein the housing further includes a generally vertical side wall that traverses the distance between the top wall and the housing outlet and wherein the side wall forms the vent apertures.

2. The apparatus of claim 1 wherein the side wall forms the vent apertures proximate the top wall.

3. The apparatus of claim 1 wherein the side wall forms the vent apertures throughout the side walls entire area between the top and bottom walls.

4. The apparatus of claim 3 further including a cover member mounted to the housing, the cover member extending to a side of the side wall opposite the cavity, including a cover wall that is spaced apart from the side wall, substantially enclosing the side wall and forming at least one exhaust outlet.

5. The apparatus of claim 4 wherein the exhaust outlet opens proximate the housing outlet.

6. The apparatus of claim 5 wherein the exhaust outlet opens downward.

7. The apparatus of claim 4 wherein the cover wall is substantially parallel to the side wall.

8. An apparatus for use with a pneumatic particulate transport assembly, the assembly including a transport duct having a duct outlet and a particulate metering device having a meter inlet, the apparatus for receiving particulate from the transport duct and temporarily storing the particulate for use by the metering device where the particulate is characterized by a particulate size, the apparatus comprising:

a housing forming a vent opening, the housing including walls that form a cavity a housing inlet linkable to the duct outlet and a housing outlet linkable to the metering device inlet, wherein at least one of the walls is a screen member having vent apertures that are generally smaller than the particulate size, the screen member being removably received within the vent opening, and wherein the housing forms a slot for receiving the screen member within the vent opening.

9. The apparatus of claim 8 wherein the screen member is characterized by a screen thickness dimension, the housing includes first and second facing lateral walls on opposite sides of the vent opening and the slot includes first and second facing parallel rib member pairs on the first and second walls, respectively, the first and second pairs defining the vent opening there between where each pair defines a dimension there between that is similar to the screen thickness dimension.

10. The apparatus of claim 9 further including a cover member mounted to the housing, the cover member extending to a side of the rib member pairs opposite the cavity, including a cover wall that is spaced apart from the rib member pairs, substantially enclosing the rib member pairs and forming at least one exhaust outlet.

11. The apparatus of claim 10 wherein the exhaust outlet opens proximate the housing, outlet.

12. The apparatus of claim 11 wherein the exhaust outlet opens downward.

13. The apparatus of claim 12 wherein, with the screen member received within the pairs, the cover wall is substantially parallel to the screen member.

14. An apparatus for use with a pneumatic particulate transport assembly, the assembly, including a transport duct having a duct outlet and a particulate metering device having a meter inlet, the apparatus for receiving particulate from the transport duct and temporarily storing the particulate for use by the metering device where the particulate is characterized by a particulate size, the apparatus comprising:

a housing including at least one side wall that defines a cavity, the housing forming a housing inlet proximate a top end of the housing and a housing outlet proximate a bottom end of the housing, the housing including at least one vent wall forming a plurality of vent apertures proximate the top end of the housing where the vent apertures are generally smaller than the particulate size; and a cover member mounted to the housing, the cover member extending to a side of the vent wall opposite the cavity, including a cover wall that is spaced apart from the vent wall, substantially enclosing the vent wall and forming at least one exhaust outlet.

15. The apparatus of claim 14 wherein the housing inlet opens downwardly into the cavity.

16. The apparatus of claim 15 wherein the cavity opens downwardly into the housing outlet.

17. The apparatus of claim 16 wherein the housing includes a top wall and four substantially vertical side walls that together define the cavity, the cavity is generally cubic and wherein the vent wall is one of the side walls.

18. The apparatus of claim 17 wherein the exhaust outlet opens downward.

19. The apparatus of claim 14 wherein the housing forms a vent opening and the vent wall comprises a screen member removably received within the vent opening.

20. An assembly for pneumatically transporting particulate from a main hopper to a metering device where the main hopper includes a particulate outlet and the metering device includes a meter inlet, the assembly comprising:

an air source operably linked to the hopper outlet to entrain particulate at the hopper outlet in an air stream;

a transport duct having a duct inlet and a duct outlet, the duct inlet operably linked down stream of the hopper outlet to receive the particulate entrained air stream from the source; and a housing including walls that form a cavity, a housing inlet linked to the duct outlet and a housing outlet linked to the metering device inlet, at least one of the housing walls forming a vent configured to trap particulate while allowing air to pass there through, wherein the housing inlet opens downwardly, the cavity opens downwardly into the housing outlet, and wherein the vent includes a plurality of apertures formed in a side housing vent wall where the apertures are generally dimensionally smaller than dimensions of the particulate being transferred, the housing further including a cover member mounted to the housing that extends to a side of the vent wall opposite the cavity, the cover member including a cover wall that is spaced apart from the vent wall, the cover wall substantially enclosing the vent wall and forming a downwardly opening exhaust outlet.

21. The assembly of claim 20 wherein the housing forms a vent opening and the vent wall comprises a screen member removably received within the vent opening.

* * * * *